(12) United States Patent
Ivanov et al.

(10) Patent No.: US 11,055,986 B2
(45) Date of Patent: Jul. 6, 2021

(54) MATCHING OBSERVATIONAL POINTS TO ROAD SEGMENTS REPRESENTED AS EDGES IN GRAPHS

(71) Applicant: HARMAN BECKER AUTOMOTIVE SYSTEMS GMBH, Karlsbad-Ittersbach (DE)

(72) Inventors: Volodymyr Ivanov, Odelzhausen (DE); Alexey Pryakhin, Munich (DE); Ievgenii Borshch, Munich (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 200 days.

(21) Appl. No.: 15/653,308

(22) Filed: Jul. 18, 2017

(65) Prior Publication Data

US 2018/0023959 A1 Jan. 25, 2018

Related U.S. Application Data

(60) Provisional application No. 62/364,805, filed on Jul. 20, 2016.

(51) Int. Cl.
*G01C 21/26* (2006.01)
*G01C 21/28* (2006.01)
(Continued)

(52) U.S. Cl.
CPC ......... *G08G 1/0104* (2013.01); *G01C 15/002* (2013.01); *G01C 21/26* (2013.01);
(Continued)

(58) Field of Classification Search
CPC ...... G01C 21/30; G01C 21/26; G01C 15/002; G01C 21/36; G01C 21/3697; G01C 21/32;
(Continued)

(56) References Cited

U.S. PATENT DOCUMENTS 4,796,191 A * 1/1989 Honey ............... G01C 21/14
701/445
6,856,897 B1 2/2005 Phuyal et al.
(Continued)

OTHER PUBLICATIONS

Non-Final Office Action received for U.S. Appl. No. 15/653,326 dated Mar. 21, 2019, 31 pages.
(Continued)

*Primary Examiner* — Stephen Holwerda
(74) *Attorney, Agent, or Firm* — Artegis Law Group, LLP (57) ABSTRACT

In one embodiment, a match application identifies an edge corresponding to a road segment based on an observational point specifying an estimated position and an estimated heading. The match application performs search operations on a road network graph based on the estimated position to identify multiple candidate edges. For a first candidate edge, the match application computes a first quality level based on at least a distance between the estimated position and the first candidate edge and an angle between the estimated heading and a direction associated with the first candidate edge. Subsequently, the match application determines that the first quality level indicates that the first candidate edge has a higher quality than any other candidate edge. Finally, the match application transmits the first candidate edge to an application that associates content specified in relation to the estimated position with the first candidate edge.

18 Claims, 4 Drawing Sheets

(51) Int. Cl.

| | | |
|---|---|---|
| G01C 21/30 | (2006.01) | |
| G08G 1/01 | (2006.01) | |
| G01C 15/00 | (2006.01) | |
| G06T 7/12 | (2017.01) | |
| G06F 16/29 | (2019.01) | |
| G06F 16/28 | (2019.01) | |
| G01S 19/53 | (2010.01) | |
| G06F 8/65 | (2018.01) | |
| G08G 1/0962 | (2006.01) | |
| G01C 21/36 | (2006.01) | |
| G08G 1/052 | (2006.01) | |
| G08G 1/0967 | (2006.01) | |
| G01S 19/51 | (2010.01) | |
| G08G 1/00 | (2006.01) | |
| G01C 21/32 | (2006.01) | |
| G06T 17/05 | (2011.01) | |
| G01C 21/34 | (2006.01) | |
| G06F 9/445 | (2018.01) | |
| G06F 17/10 | (2006.01) | |
| G08G 1/09 | (2006.01) | |

(52) U.S. Cl.
CPC .............. *G01C 21/28* (2013.01); *G01C 21/30* (2013.01); *G01C 21/32* (2013.01); *G01C 21/3415* (2013.01); *G01C 21/36* (2013.01); *G01C 21/3697* (2013.01); *G01S 19/51* (2013.01); *G01S 19/53* (2013.01); *G06F 8/65* (2013.01); *G06F 9/44526* (2013.01); *G06F 16/284* (2019.01); *G06F 16/29* (2019.01); *G06F 17/10* (2013.01); *G06T 7/12* (2017.01); *G06T 17/05* (2013.01); *G08G 1/0112* (2013.01); *G08G 1/052* (2013.01); *G08G 1/093* (2013.01); *G08G 1/0967* (2013.01); *G08G 1/09623* (2013.01); *G08G 1/096716* (2013.01); *G08G 1/20* (2013.01)

(58) Field of Classification Search
CPC ... G01C 21/3415; G01C 21/28; G06F 16/284; G06F 9/44526; G06F 17/10; G06F 8/65; G06F 16/29; G06T 7/12; G06T 17/05; G08G 1/052; G08G 1/0967; G08G 1/0104; G08G 1/096716; G08G 1/20; G08G 1/093; G01S 19/51; G01S 19/53
See application file for complete search history.

(56) References Cited

U.S. PATENT DOCUMENTS

| | | |
|---|---|---|
| 7,164,117 B2 | 1/2007 | Breed et al. |
| 7,616,781 B2 | 11/2009 | Schofield et al. |
| 8,731,305 B1 | 5/2014 | Mantri |
| 9,361,797 B1 | 6/2016 | Chen et al. |
| 9,672,734 B1 | 6/2017 | Ratnasingam |
| 10,074,270 B2 | 9/2018 | Ivanov et al. |
| 10,332,389 B2 | 6/2019 | Ivanov et al. |
| 2002/0035432 A1 | 3/2002 | Kubica et al. |
| 2003/0023369 A1* | 1/2003 | Takashima ............ G01C 21/30 701/532 |
| 2003/0060970 A1 | 3/2003 | Edge |
| 2006/0208169 A1 | 9/2006 | Breed et al. |
| 2007/0213896 A1* | 9/2007 | Fischer ................ G08G 1/0962 701/33.4 |
| 2008/0004789 A1 | 1/2008 | Horvitz et al. |
| 2009/0005979 A1* | 1/2009 | Nakao .................. G01C 21/30 701/414 |
| 2009/0140887 A1* | 6/2009 | Breed .................... G01S 17/86 340/990 |
| 2009/0228204 A1* | 9/2009 | Zavoli .................... G01S 19/49 701/532 |
| 2010/0020074 A1* | 1/2010 | Taborowski ............. G06T 7/70 345/420 |
| 2010/0057336 A1* | 3/2010 | Levine .................. G01C 21/26 701/532 |
| 2010/0082564 A1 | 4/2010 | Fernekes |
| 2010/0198503 A1 | 8/2010 | Beckner et al. |
| 2010/0211309 A1 | 8/2010 | Sugawara et al. |
| 2010/0321489 A1* | 12/2010 | Chen .................... G01C 11/02 348/116 |
| 2012/0197839 A1 | 8/2012 | Vervaet et al. |
| 2012/0271864 A1 | 10/2012 | Morlock |
| 2013/0328924 A1 | 12/2013 | Arikan et al. |
| 2014/0058661 A1 | 2/2014 | Choi et al. |
| 2014/0306814 A1 | 10/2014 | Ricci |
| 2016/0091323 A1 | 3/2016 | MacGougan et al. |
| 2016/0167582 A1 | 6/2016 | Chen et al. |
| 2016/0171893 A1 | 6/2016 | Chen et al. |
| 2017/0120803 A1 | 5/2017 | Kentley et al. |
| 2017/0268896 A1 | 9/2017 | Bai et al. |
| 2017/0287233 A1 | 10/2017 | Nix |
| 2017/0332198 A1 | 11/2017 | Dannenbring et al. |
| 2018/0003512 A1 | 1/2018 | Lynch |
| 2018/0023964 A1 | 1/2018 | Ivanov et al. |
| 2018/0025029 A1 | 1/2018 | Ivanov et al. |
| 2019/0114909 A1 | 4/2019 | Halama et al. |

OTHER PUBLICATIONS

Final Office Action received for U.S. Appl. No. 15/653,326 dated Oct. 3, 2019, 34 pages.
Non-Final Office Action received for U.S. Appl. No. 15/653,314 dated Sep. 19, 2018, 15 pages.
Notice of Allowance received for U.S. Appl. No. 15/653,314 dated Feb. 7, 2019, 18 pages.
Notice of Allowance received for U.S. Appl. No. 15/653,321 dated May 7, 2018, 17 pages.
Non-Final Office Action received for U.S. Appl. No. 15/653,335 dated May 9, 2019, 15 pages.
Final Office Action received for U.S. Appl. No. 15/653,335 dated Sep. 25, 2019, 18 pages.
Non-Final Office Action received for U.S. Appl. No. 15/653,335, dated Jan. 21, 2020, 15 pages.
Non-Final Office Action for U.S. Appl. No. 15/653,326, dated Feb. 6, 2020, 25 pages.
Final Office Action received for U.S. Appl. No. 15/653,335, dated May 6, 2020, 9 pages.
Non-Final Office Action for U.S. Appl. No. 15/653,335; dated Sep. 1, 2020; 13 pages.

\* cited by examiner

MATCHING OBSERVATIONAL POINTS TO ROAD SEGMENTS REPRESENTED AS EDGES IN GRAPHS

CROSS-REFERENCE TO RELATED APPLICATIONS

This application claims benefit of the U.S. Provisional Patent Application having Ser. No. 62/364,805 and filed on Jul. 20, 2016. The subject matter of this related application is hereby incorporated herein by reference.

BACKGROUND

Field of the Various Embodiments

The various embodiments relate generally to navigation subsystems and, more specifically, to matching observational points to road segments represented as edges in graphs.

Description of the Related Art

Many vehicles include navigation applications that perform navigation-related activities based on satellite navigation devices (e.g., global positioning system devices) and road network graphs that specify underlying, physical road networks. A road network graph typically represents each road segment (i.e., a portion of a road) as an edge that extends between two nodes, where each node represents a discrete point. A road segment may specify any number of additional points to define a non-linear shape of the road segment. To enable a wide range of navigation-related activities, road network graphs are typically configured to associate data with road segments via attributes. More precisely, each attribute is associated with a road segment and specifies road data that is related to the road segment or navigation of the road segment. For example, an attribute could be associated with a road segment that lies between two intersections, and the attribute could specify a speed limit that is applicable between the two intersections.

In one approach to providing road data, a road data provider generates attributes based on observations received from numerous vehicles traveling along roads. Typically, each observation specifies data collected by various sensors, such as an estimated position of the vehicle at the time of the observation, an estimated speed of the vehicle at the time of the observation, and an estimated type of the observed object, to name a few. For each observed object, a data collection application generates an observational point based on any number of the observations and transmits the observational point to an attribute application. As referred to herein, an "observational point" may specify an estimated object position, content that describes the object, and any number of additional parameters that are associated with one or more observations of the object. For example, the estimated object position could specify an average position of the object based on multiple observations, and the content could describe a type of the object (e.g., speed limit sign specifying 70 miles per hour). Further, the additional parameters could include an average heading and a side of a vehicle along which the object was observed.

As persons skilled in the art will recognize, each observational point is prone to error. For example, the accuracy of an estimated object position is dependent on the accuracy of the sensors that provided the position and speed of the vehicles that observed the object. For this reason, the estimated object position may not lie directly along a road segment. Accordingly, upon receiving an observational point, the attribute application identifies an edge of the road network graph that is geometrically closest to the estimated object position and generates an attribute that associates the content with the identified edge.

One limitation of associating an observational point with the geometrically closest edge is that the geometrically closest edge does not necessarily represent the road segment along which the observed object actually lies. For example, a vehicle traveling along an expressway "A" at a high speed could observe a speed limit sign of 55 miles per hour and generate an observation. Because of limitations of the sensors and the relatively high speed, the estimated position of the vehicle included in the observation could be inaccurate by as much as 400 meters. Consequently, as part of generating a observational point corresponding to the speed limit sign, the data collection application could compute an estimated object position that lies closer to a roundabout "B" than the expressway "A." Upon receiving the observational point, the attribute application would identify the edge that represents the roundabout "B" as the closest edge and incorrectly associate a speed limit of 55 miles per hour with the roundabout "B."

As the foregoing illustrates, more effective techniques for associating content specified in relation to an estimated position with a road segment would be useful.

SUMMARY

One embodiment sets forth a method for associating an observational point with a road segment. The method includes performing one or more search operations on a road network graph based on an estimated position associated with the observational point to identify candidate edges, where each candidate edge corresponds to a different road segment; computing a first quality level associated with a first candidate edge based on at least a first distance and a first angle, where the first distance is a distance between the estimated position and the first candidate edge, and the first angle is an angle between an estimated heading associated with the observational point and a direction associated with the first candidate edge; determining that the first quality level is greater than a quality level associated with any other candidate edge included in the plurality of candidate edges; and in response, transmitting at least one of information associated with the first candidate edge or a request for information associated with the first candidate edge to an application.

Further embodiments provide, among other things, a system and a computer-readable medium configured to implement the method set forth above.

At least one advantage of the disclosed techniques is that, by comparing multiple candidate edges, the likelihood of associating information (e.g., a road sign) with the proper road segment is increased relative to conventional approaches. More specifically, the disclosed techniques are able to more accurately identify the proper edge and corresponding road segment along which information lies when a distance between the estimated position and the proper edge is larger than a distance between the estimated position and a different edge. By contrast, in such a scenario, conventional approaches would incorrectly identify the different edge that corresponds to a different road segment as the proper edge.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Road Network Graph System

Figure 1:
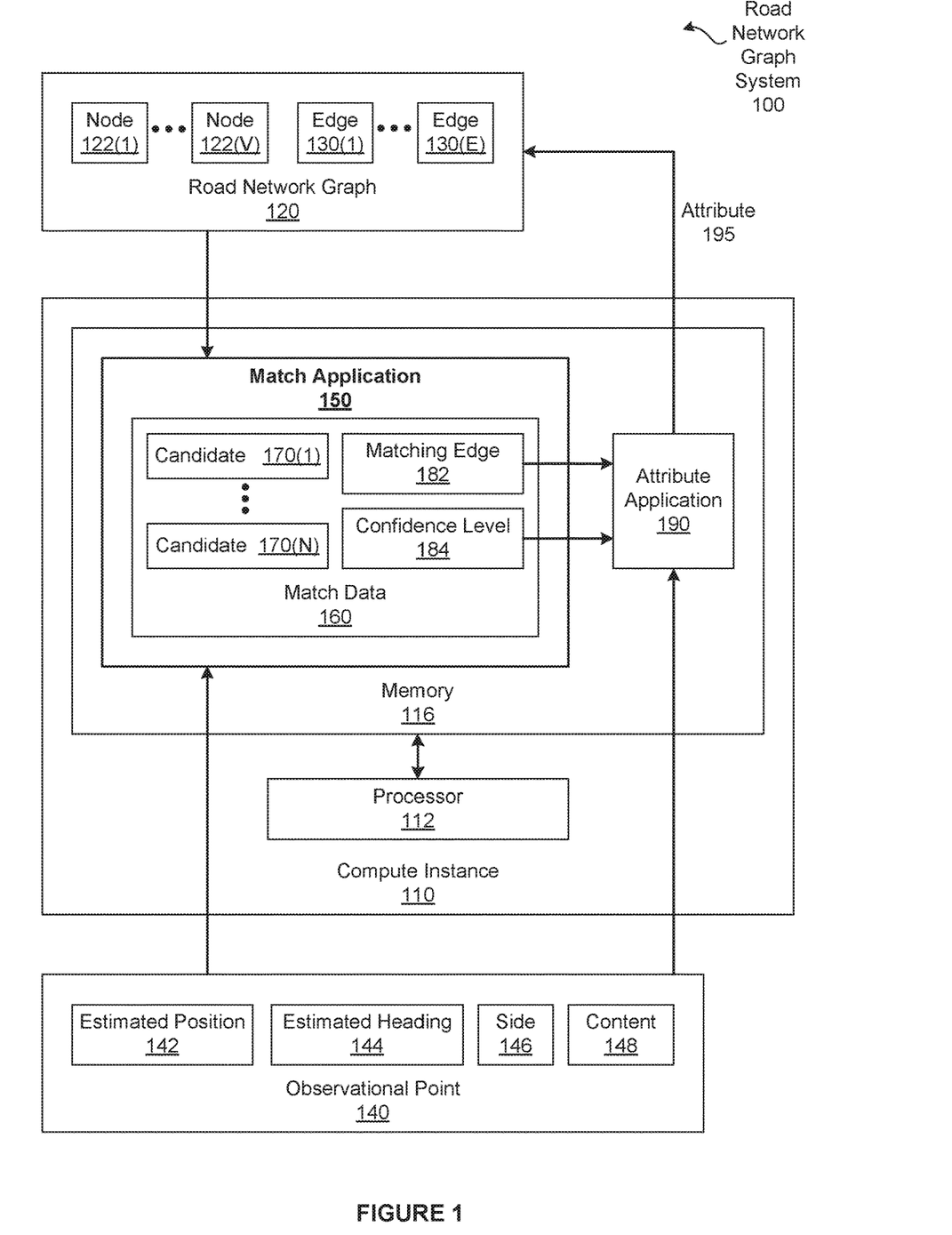
FIG. 1 illustrates a road network graph system configured to implement one or more aspects of the various embodiments.

FIG. 1 illustrates a road network graph system 100 configured to implement one or more aspects of the various embodiments. As shown, the road network graph system 100 includes, without limitation, a a road network graph 120, an observational point 140, and a compute instance 110. In alternate embodiments, the road network graph system 100 may include any number (including zero) of road network graphs 120, observational points 140 and compute instances 110. For explanatory purposes, multiple instances of like objects are denoted with reference numbers identifying the object and parenthetical numbers identifying the instance where needed.

The road network graph 120 represents at least a portion of an underling road network. As shown, the road network graph 120 includes, without limitation, any number of nodes 122 and any number of edges 130. Each of the nodes 122 represents a discrete point within the underlying road network. Examples of discrete points represented by the nodes 122 include, without limitation, intersections between roads, exit ramps, and entrance ramps, to name a few. Each edge 130 represents a road segment and is associated with a traveling direction along the road segment. As referred to herein, a road segment is a portion of a road that lies between two discrete points that are represented by two of the nodes 122. For example, a road segment could be a portion of a one-lane road that lies between two intersections or the east-west lanes of a portion of a freeway that lies between two exits. In alternate embodiments, one or more of the edges 130 may be associated with two traveling directions.

Each of the edges 130 includes, without limitation, a point list (not shown in FIG. 1) that specifies a shape of the represented road segment. The point list includes a start node 122, any number (including zero) of intermediate points, and an end node 122. For example, to represent a linear road segment, the point list included in the edge 130(1) could specify the start node 122(1) and the end node 122(2). In another example, to represent a non-linear road segment, the point list included in the edge 130(2) could specify the start node 122(2), six intermediate points, and the end node 122(3).

To enable a wide range of activities, the road network graph 120 is configured to associate content with road segments via attributes. More precisely, each such attribute is associated with a road segment and specifies road data that is related to the road segment or navigation of the road segment. For instance, in some embodiments, the road network graph system 100 may include any number of vehicles (not shown in FIG. 1). Each vehicle may include a navigation application that enables a user to perform navigation-related operations (e.g., viewing maps, generating and viewing directions and travel times, etc.) based on the road network graph 120 and, optionally, sensor data. The navigation applications may be associated with the road network graph 120 in any technically feasible fashion. For example, a navigation application could access the road network graph 120 via the Internet and/or store the road network graph 120 in a memory associated with the vehicle. To facilitate navigation operations via these types of navigation applications, the road network graph 120 may include an attribute 195 that is associated with a road segment that lies between two intersections, the attribute 195 may specify a speed limit that is applicable between the two intersections.

In one approach to providing road data, a road data provider generates attributes based on observations received from numerous vehicles traveling along roads. Typically, each observation specifies data collected by various sensors, such as an estimated position of the vehicle at the time of the observation, an estimated speed of the vehicle at the time of the observation, and an estimated type of the observed object, to name a few. For each observed object, a data collection application generates the observational point 140 based on any number of the observations and transmits the observational point 140 to a conventional attribute application.

In general, the vehicles may be any type of vehicles and may communicate observations to any number of devices and any number of applications in any technically feasible fashion. For example, a particular vehicle could be an autonomous vehicle that transmits/receives observations to/from other vehicles, transmits observations to a server associated with the road data provider, and/or receives the road network graph 120 from another server associated with the road data provider.

As shown, the observational point 140 includes, without limitation, an estimated position 142, an estimated heading 144, a side 146, and any amount and type of content 148. The estimated position 142 specifies a position of an object. The estimated heading 144 specifies a heading associated with observation(s) of the object. The sign specifies a relative position associated with observations of the object. If the object is associated with a single physical object that is observed to the left of a vehicle, then the side 146 specifies "left." If the object is associated with a single physical object that is observed to the right of a vehicle, then the side 146 specifies "right." If the object is associated with a single physical object that is observed above a vehicle, then the side 146 specifies "overhead." If the object is associated with two physical objects, such as a road sign mounted on a median and a substantially identical road sign mounted on the right side of the road, then the side 146 specifies "bi-sided." The content 148 describes any number of characteristics associated with the object.

For example, the estimated position 142 could specify an average position of the object based on multiple observations from multiple vehicles. The estimated heading 144 could specify an average heading of the vehicles. The side 146 could specify "left" to indicate that the object was observed to the left of the vehicles. The content 148 could describe a type of the object (e.g., speed limit sign specifying 70 miles per hour).

In various embodiments, the observational point 140 may specify any amount and type of additional information and/or omit any number of the estimated position 142, the estimated heading 133, the side 146, and the content 148. For example, in some embodiments, the observational point 140 may specify an estimated position of the vehicle instead of the estimated position 142 of the object. In such embodiments, an application may compute the estimated position 142 based on the estimated position of the vehicle, the estimated heading 144, and an estimated speed.

As persons skilled in the art will recognize, the observational point 140 is prone to error. In particular, the content 148 is specified in relation to the estimated position 142, and the estimated position 142 is not necessarily accurate. For example, the accuracy of the estimated position 142 is dependent on the accuracy of the sensors that provided the position and speed of the vehicles that observed the object. For this reason, the estimated position 142 may not lie directly along a road segment. Accordingly, upon receiving the observational point 140, a conventional attribute application identifies the edge 130 included in the road network graph 120 that is geometrically closest to the estimated position 142. The conventional attribute application then generates the attribute 195 that associates the content 148 with the identified edge 130.

One limitation of associating the observational point 140 with the geometrically closest edge 130(x) is that the geometrically closest edge 130(x) does not necessarily represent the road segment along which the observed object actually lies. For example, a vehicle traveling along an expressway "A" at a high speed could observe a speed limit sign of 55 miles per hour and generate an observation. Because of limitations of the sensors and the relatively high speed, the estimated position of the vehicle included in the observation could be inaccurate by as much as 400 meters. Consequently, as part of generating the observational point 140 corresponding to the speed limit sign, the data collection application could compute the estimated position 142 that lies closer to a roundabout "B" than the expressway "A." Upon receiving the observational point 140, the conventional attribute application would identify the edge 130(x) that represents the roundabout "B" as the closest edge and generate the attribute 195 that incorrectly associates a speed limit of 55 miles per hour with the roundabout "B."

Reliably Associating Content with Road Segments

To more reliably associate the content 148 with the proper road segment, the road network graph system 100 includes a match application 150 and an attribute application 190. In operation, the match application 150 generates match data 160 based on, without limitation, the road network graph 120 and the observational point 140. As shown, the match data 160 includes, without limitation, any number of candidates 170, a matching edge 182, and a confidence level 184.

Figure 2:
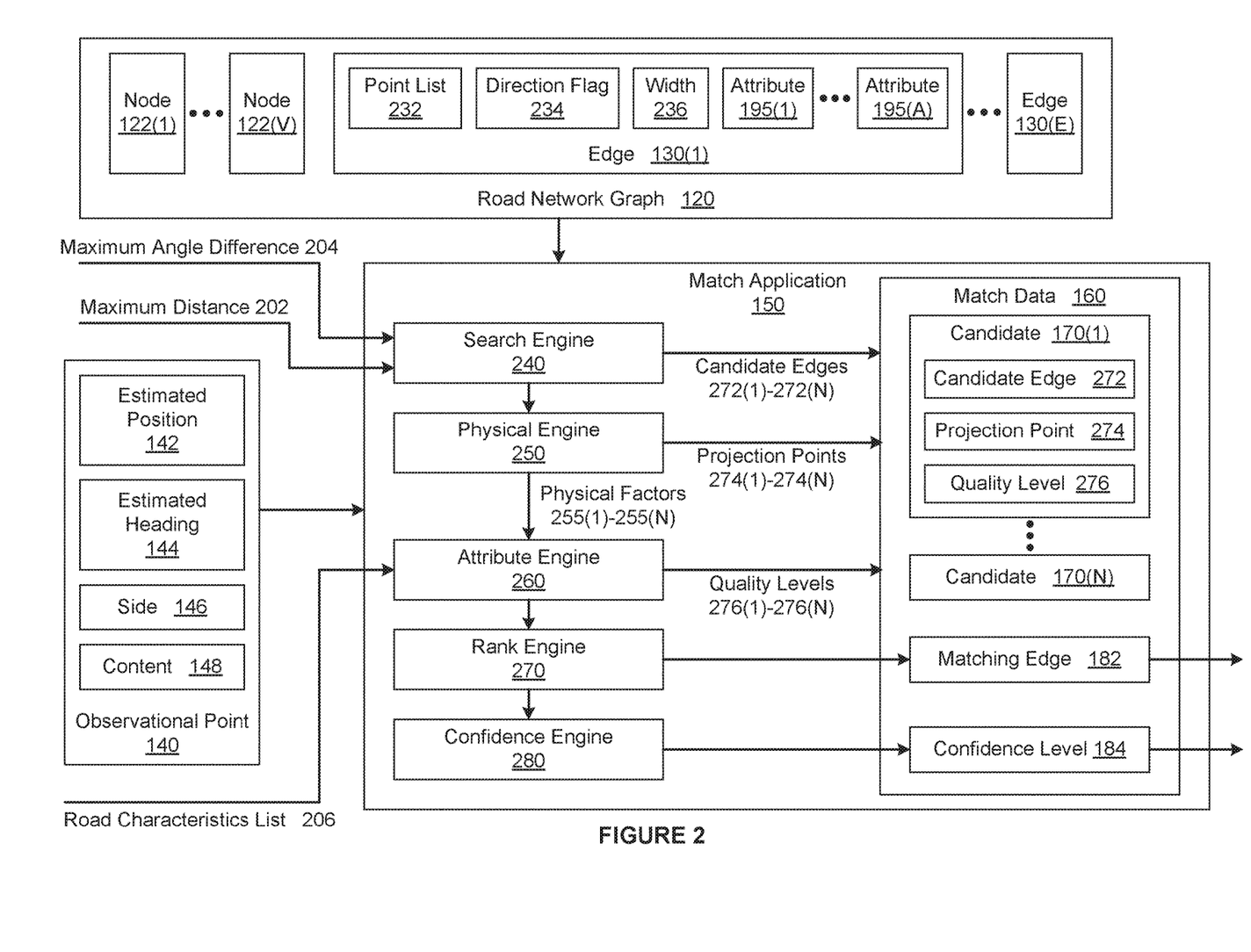
FIG. 2 is a more detailed illustration of the match application of FIG. 1, according to various embodiments.

In operation, and as described in detail in conjunction with FIG. 2, the match application 150 performs search operation(s) on the road network graph 120 based on the estimated position 142 and the estimated heading 144 to identify one or one of the edges 130 as candidate edge(s). For each candidate edge, the match application 150 generates the candidate 170 that specifies the candidate edge. Subsequently, for each of the candidates 170, the match application 150 computes an associated quality level (not shown in FIG. 1) based on the point list included in the specified candidate edge, the estimated position 142, the estimated heading 144, and any amount of additional information (e.g., existing attributes 195 included in the specified candidate edge). The quality level of a given candidate 170 estimates a conformity of the specified candidate edge to the observational point 140.

Subsequently, the match application 150 ranks the candidates 170 based on the quality levels, and selects the candidate edge specified in the highest quality candidate 170 as the matching edge 182. Finally, the match application 150 generates the confidence level 184 based on a total number of the candidates 170, the quality levels, and any amount of additional information (e.g., existing attributes 195 associated with the matching edge 182). The confidence level 184 indicates a confidence that the matching edge 182 represents the road segment that is associated with the content 148. In alternate embodiments, the match application 150 may generate the matching edge 182, but not the confidence level 184.

As shown, the attribute application 190 receives the matching edge 182, the confidence level 184, and the observational point 140 and, in response, generates the attribute 195 that associates the content 148 with the matching edge 182. In alternate embodiments, the attribute application 190 may receive the content 148 in any technically feasible fashion (e.g., from the match application 150) and may not receive the observational point 140. Advantageously, unlike conventional approaches to generating the attribute 195, the attribute 195 does not invariably associate the content 148 with the road segment represented by the edge 182 that is geometrically closest to the estimated position 142. In some embodiments, the attribute application 190 may compare the confidence level 184 associated with the matching edge 182 to an acceptable confidence level. Based on such a comparison, the attribute application 190 may determine whether to generate the attribute 195.

As shown, the match application 150 and the attribute application 190 reside in a memory 116 that is included in the compute instance 110 and executes on a processor 112 that is included in the compute instance 110. In alternate embodiments, the road network graph system 100 may include any number of compute instances 110, any number of memories 116, and any number of processors 112 that are implemented in any technically feasible fashion. Further, the match application 150 and the attribute application 190 may reside in different memories 116, execute on different processors 112, and/or be associated with different compute instances 110.

In various embodiments, the compute instance 110 may be implemented as a stand-alone chip or as part of a more comprehensive solution that is implemented as an application-specific integrated circuit (ASIC), a system-on-a-chip (SoC), and so forth. Further, the compute instance 110, the memory 116, and the processor 112 may be implemented via any number of physical resources located in any number of physical positions. For example, the match application 150 could be included in the compute instance 110(1) that is implemented in a laptop, and the attribute application 190 could be included in a compute instance 110(2) that is implemented in a cloud computing environment or a distributed computing environment.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

It will be appreciated that the road network graph system 100 shown herein is illustrative and that variations and modifications are possible. The number of compute instances 110, the number of match applications 150, the number of attribute applications 190, the number of road network graphs 120, the number of observational points 140, and the connection topology between the various units in the road network graph system 100 may be modified as desired. The match application 150 may be implemented in a stand-alone fashion or integrated in any other application (e.g., the attribute application 190) or device in any technically feasible fashion. Further, the functionality included in the match application 150 may be divided across any number of applications that are stored and executed via any number of devices that are located in any number of physical positions.

In alternate embodiments, the observational point 140 may be generated in any technically feasible fashion based on any amount of information. For example, in some alternate embodiments, the observational point 140 may be generated directly from any type of surveying application instead of the data collection application and may represent only one survey data point. In other alternate embodiments, the observational point 140 may be received from a single vehicle and include content that specifies an operation, such as "return the speed limit that is currently applicable to this vehicle." In such embodiments, an application (e.g., the attribute application 190, the match application 150, or another application) may be configured to determine the speed limit based on existing attributes associated with the matching edge 182. Further, the application may be configured to transmit the speed limit directly to the single vehicle. In alternate embodiments, the road network graph system 100 does not necessarily include attribute generation functionality, and may or may not include the attribute application 190.

Selecting a Matching Edge

FIG. 2 is a more detailed illustration of the match application 150 of FIG. 1, according to various embodiments. As shown, the match application 150 includes, without limitation, the match data 160, a search engine 240, a physical engine 250, an attribute engine 260, a rank engine 270, and a confidence engine 280. Upon receiving the road network graph 120 and the observational point 140, the match application 150 generates the match data 160. Subsequently, the match application 150 transmits the matching edge 182 and, optionally, the confidence level 184 to any number and type of road data applications, such as the attribute application 190. In this fashion, the match application 150 enables road data applications to associate the content 148 specified relative to the estimated position 142 to a road segment represented by the matching edge 182.

As shown, the search engine 240 receives the road network graph 120, the observational point 140, a maximum distance 202, and a maximum angle difference 204. Each of the edges 130 included in the road network graph 120 includes, without limitation, a point list 232, a direction flag 234, a width 236, and any number and type of attributes 195. The point list 232 specifies a start node 122(s) as a first point, any number (including 0) of intermediate points, and an end node 122(e) as a final point. Together, the points included in the point list 232 define a shape of the edge 130. As referred to herein, the line between any two adjacent points included in the point list 232 comprises a "geometry segment" of the edge 130.

The direction flag 234 specifies a traveling direction associated with the edge 130. If the direction flag 234 specifies a positive direction, then the traveling direction with respect to the edge 130 is from the first point included in the point list 232 to the last point included in the point list 232. If the direction flag 234 specifies a negative direction, then the traveling direction is from the last point included in the point list 232 to the first point included in the point list 232. If the direction flag 234 specifies both directions, then the traveling direction with respect to the edge 130 may be either a positive direction or a negative direction. The traveling direction is also referred to herein as the "forward direction," and the direction opposite to the traveling direction is also referred to herein as the "backward direction."

In general, the search engine 240 performs search operations on the road network graph 120 based on the observational point 140, the maximum distance 202, and the maximum angle difference 204. The search engine 240 may receive the road network graph 120, the observational point 140, the maximum distance 202, and the maximum angle difference 204 in any technically feasible fashion. For example, the search engine 240 could receive any number of the road network graph 120, the observational point 140, the maximum distance 202, and the maximum angle difference 204 via a graphical user interface (GUI). In alternate embodiments, the search engine 240 may be configured to implement a predetermined maximum distance 202 and a predetermined maximum angle difference 204.

The search engine 240 sets a position range (not shown in FIG. 2) to a circle that is centered at the estimated position 142 and has a radius equal to the maximum distance 202. In a complimentary fashion, the search engine 240 sets an angle range (not shown in FIG. 2) to a sector that ranges from (the estimated heading 144–the maximum angle difference 204) to (the estimated heading 144+the maximum angle different 204). Subsequently the search engine 240 performs search operations on the road network graph 120 to identify each of the edges 130 for which at least a portion of the edge 130 lies within the position range, and a traveling direction associated with the portion of the edge 120 lies within the angle range. The search engine 240 determines whether at least a portion of a given edge 130 lies within the position range based on the point list 232. Further, the search engine 240 determines whether a traveling direction associated with the portion of the given edge 120 lies within the angle range based on the point list 232 and the direction flag 234.

For each identified edge 130, the search engine 240 generates a candidate 170 that includes, without limitation, a candidate edge 272 specifying the identified edge 130, a projection point 274, and a quality level 276. Accordingly, each of the candidate edges 272 is also one of the edges 130, however each of the edges 130 is not necessarily also one of the candidate edges 272. The search engine 240 specifies values for neither the projection point 274 nor the quality level 276. In alternate embodiments, the search engine 240 may identify the candidate edges 272 and generate the candidates 170 in any technically feasible fashion based on any amount and type of data. For instance, in some embodiments, the search engine 240 could identify the ten candidate edges 130 that are geometrically closest to the estimated position 142.

For each of the candidates 170($x$), the physical engine 250 computes the projection point 274($x$) and a physical factor 255($x$). First, the physical engine 250 projects the estimated position 142 onto the nearest geometry segment that is included in the candidate edge 272($x$) to determine the projection point 274($x$). The physical engine 250 then computes a projection factor (not shown) based on the position of the projection point 274($x$) relative to the nearest geometry segment. If the projection point 274 lies before a start of the nearest geometry segment, then the projection factor is less than 0. If the projection point 274 lies inside the nearest geometry segment, then the projection factor is between 0 (inclusive) and 1 (inclusive). If the projection point 274 lies after the end of the nearest geometry segment, then the projection factor is greater than 1.

Subsequently, for each of the candidates 170($x$), the physical engine 250 computes an angle factor based on the angle between the estimated heading 144 and the traveling direction associated with the nearest geometry segment that is included in the candidate edge 272($x$). In general, as the angle between the estimated heading 144 and the traveling direction associated with the nearest geometry segment increases, the angle factor decreases. In a complementary fashion, the physical engine 250 computes a distance factor based on the projection factor and a distance between the estimated position 142 and the nearest geometry segment that is included in the candidate edge 272($x$). In general, as the distance between the estimated position 142 and the nearest geometry segment increases, the distance factor decreases linearly. The physical engine 250 then determines whether the width 236 associated with the candidate edge 272($x$) impacts the distance factor.

The width 236 indicates a physical width of the road segment represented by the associated edge 130/candidate edge 272. For example, if the road segment represented by the candidate edge 272($x$) is a four lane freeway and the road segment represented by the candidate edge 272($y$) is a one lane dirt road, then the width 236 associated with the candidate edge 272($x$) is greater than the width 236 associated with the candidate edge 272($y$). If the side 146 is equal to either "left" or "right" and the projection factor associated with the candidate edge 272($x$) lies between 0 (inclusive) and 1 (inclusive), then the physical engine 250 determines that the associated width 236 impacts the associated distance factor. Otherwise the physical engine 250 determines that the associated width 236 does not impact the associated distance factor. For the candidate 170($x$), if the physical engine 250 determines that the associated width 236 impacts the associated distance factor, then the physical engine 250 adjusts the associated distance factor based on the associated width 236. In general, as the width 236 increases, the associated distance factor decreases hyperbolically.

Finally, for each of the candidates 170, the physical engine 250 computes the associated physical factor 255 as the product of the associated angle factor and the associated distance factor. The physical engine 250 then transmits the physical factors 255 to the attribute engine 260. Upon receiving the physical factors 255, the attribute engine 260 computes the quality levels 276. If the total number of the candidates 170 is equal to 1, then the attribute engine 260 sets the quality level 276(1) equal to the physical factor 255(1). If, however, the total number of the candidates 170 is greater than 1, then the attribute engine 260 evaluates the attributes 195 included in the candidate edge 272($x$) as part of computing the quality level 276($x$). More specifically, for the candidate 170($x$), the attribute engine 260 computes an attribute factor associated with the candidate edge 272($x$) and an attribute inconsistency factor associated with the candidate edge 272($x$). The default value for the attribute factor is one, and the default value for the attribute inconsistency factor is one.

In general, the attribute engine 260 sets the attribute factor to a value less than one to decrease the likelihood that the match application 150 selects a candidate edge 272 that is associated with an "unlikely" attribute 195 as the matching edge 182. The attribute engine 260 may identify unlikely attributes 195 in any technically feasible fashion. For instance, in some embodiments, the attribute engine 260 identifies the attributes 195 specifying that the associated road segment comprises a roundabout, a square, or lies within a parking lot as unlikely attributes 195.

In a complementary fashion, the attribute engine 260 sets the attribute inconsistency factor to a value less than one to decrease the likelihood that the match application 150 selects a candidate edge 272 that is associated with an "inconsistent" attribute 195 as the matching edge 182. The attribute engine 260 may identify inconsistent attributes 195 in any technically feasible fashion. For instance, in some embodiments, the attribute engine 260 may perform comparisons between any number and combination of the content 148, characteristics associated with the observational point 140, characteristics specified in a road characteristics list 206, and the attributes 195 to identify inconsistent attributes 195. For example, suppose that the content 148 specifies a road sign type "speed limit of 10 miles per hour," the attribute 195(1) specifies a freeway road type, and the road characteristics list 206 specifies that a speed limit range for a freeway road type is between 50 miles per hour and 85 miles per hour. In such a scenario, the attribute engine 260 could identify the attribute 195(1) as an inconsistent attribute 195.

Finally, for each of the candidates 170, the attribute engine 260 adjusts the physical factor 255 based on the attribute factor associated with the candidate edge 272 and the attribute inconsistency factor associated with the candidate edge 272 to determine the quality level 276. As a general matter, the attribute engine 260 may adjust the physical factor 255 in any technically feasible fashion. For example, in some embodiments, the attribute engine 260 may set the quality level 276($x$) equal to the product of the physical factor 255($x$), the attribute factor associated with the candidate edge 272($x$), and the attribute inconsistency factor associated with the candidate edge 272($x$). In this fashion, the quality level 276($x$) reflects similarities and differences between the road segment that corresponds to the observational point 140 and the road segment that is represented by the candidate edge 272($x$).

The rank engine 270 performs any number of ordering operations to rank the candidates 170 based on the quality levels 276. The rank engine 270 then identifies the highest quality candidate 170 and sets the matching edge 182 equal to the candidate edge 272 included in the identified candidate 170. The confidence engine 280 computes the confidence level 184 associated with the matching edge 182 based on the candidates 170.

First, the confidence engine 280 computes a quality difference factor based on the difference between the highest quality level 276 (associated with the matching edge 182) and the next highest quality level 276. The confidence engine 280 then computes a quality count factor based on the total number of the candidates 170 and a configurable strictness coefficient. The strictness coefficient defaults to 1 and reflects the maximum distance 202 and the maximum angle difference 204. In general, the confidence engine 280 may compute the quality difference factor and the quality count factor in any technically feasible fashion. For instance, in some embodiments, the search engine 240 constrains the total number of candidates 170 to less than 100, and the confidence engine 280 divides the strictness coefficient by the total number of the candidates 170 and then multiplies the result by 100 to compute the quality count factor.

The confidence engine 280 multiples the highest quality level 276, the quality difference factor, and the quality count factor to generate a physical confidence factor. In some circumstance, the confidence engine 280 subsequently computes one or more additional confidence factors based on the attributes 195 associated with the matching edge 182. For instance, in some embodiments, if the distance from the projection point 274 included in the matching candidate 170 lies within 100 meters of an intersection, then the confidence engine 280 computes an intersection confidence factor. As referred to herein, an "intersection" corresponds to a node 122 that is associated with multiple outgoing edges 130.

In general, the intersection confidence factor reflects that a confidence that the matching candidate edge 272 represents the road segment associated with the content 148 decreases when the associated projection point 274 is relatively close to a physical intersection. The confidence engine 280 may compute the intersection confidence factor in any technically feasible fashion. For instance, in some embodiments, the confidence engine 280 may compute the intersection confidence factor based on any number of the following:

the distance from the projection point 274 associated with the matching edge 182 to the start node 122 associated with the matching edge 182 in the forward direction
the distance from the projection point 274 associated with the matching edge 182 to the end node 122 associated with the matching edge 182 in the backward direction
the distance from the end node 122 associated with the matching edge 182 to the next node 122 associated with multiple outgoing edges 130 in the forward direction In the same or other embodiments, if the side 146 is equal to either left or right, and the attributes 195 indicate that the matching edge 182 is a freeway (a one-way road with a divider), then the confidence engine 280 computes an exit lane confidence factor based on a nearest exit lane. The confidence engine 280 may compute the exit lane confidence factor in any technically feasible fashion. For instance, in some embodiments, the confidence engine 280 may compute a next exit lane confidence factor based on the distance from the end node 122 associated with the matching edge 182 to the next attribute 130 indicating an exit lane on the side 146 in the forward direction. The confidence engine 280 may compute a previous exit lane confidence factor based on the distance from the start node 122 associated with the matching edge 182 to the previous attribute 130 indicating an exit lane on the side 146 in the backward direction. If the next exit lane confidence factor is more significant than the previous exit lane confidence factor, then the confidence engine 280 may set the exit lane confidence factor to the next exit lane confidence factor. Otherwise, the confidence engine 280 may set the exit lane confidence factor to the previous exit lane confidence factor.

Subsequently, the confidence engine 280 computes the confidence level 184 based on the physical confidence factor and, optionally, any additional confidence factors (e.g., the intersection confidence factor, the exit lane confidence factor, etc.). The confidence engine 280 may compute the confidence level 184 in any technically feasible fashion. For instance, in some embodiments, the confidence engine 280 sets the confidence level 184 to the product of the physical confidence factor and any additional confidence factors.

Note that the techniques described herein are illustrative rather than restrictive, and may be altered without departing from the broader spirit and scope of the contemplated embodiments. Many modifications and variations on the functionality provided by the match application 150 will be apparent to those of ordinary skill in the art without departing from the scope and spirit of the described embodiments. For instance, in some embodiments, the search engine 240 may identify the candidate edges 272 based on the estimated position 142 and not the estimated heading 144. In the same or other embodiments, the match application 150 may not compute the confidence levels 172. In alternate embodiments, the observational point 140 and the road network graph 120 may specify any amount and type of data in any format that enables the match application 150 to identify and evaluate the candidates edges 130.

Figure 3:
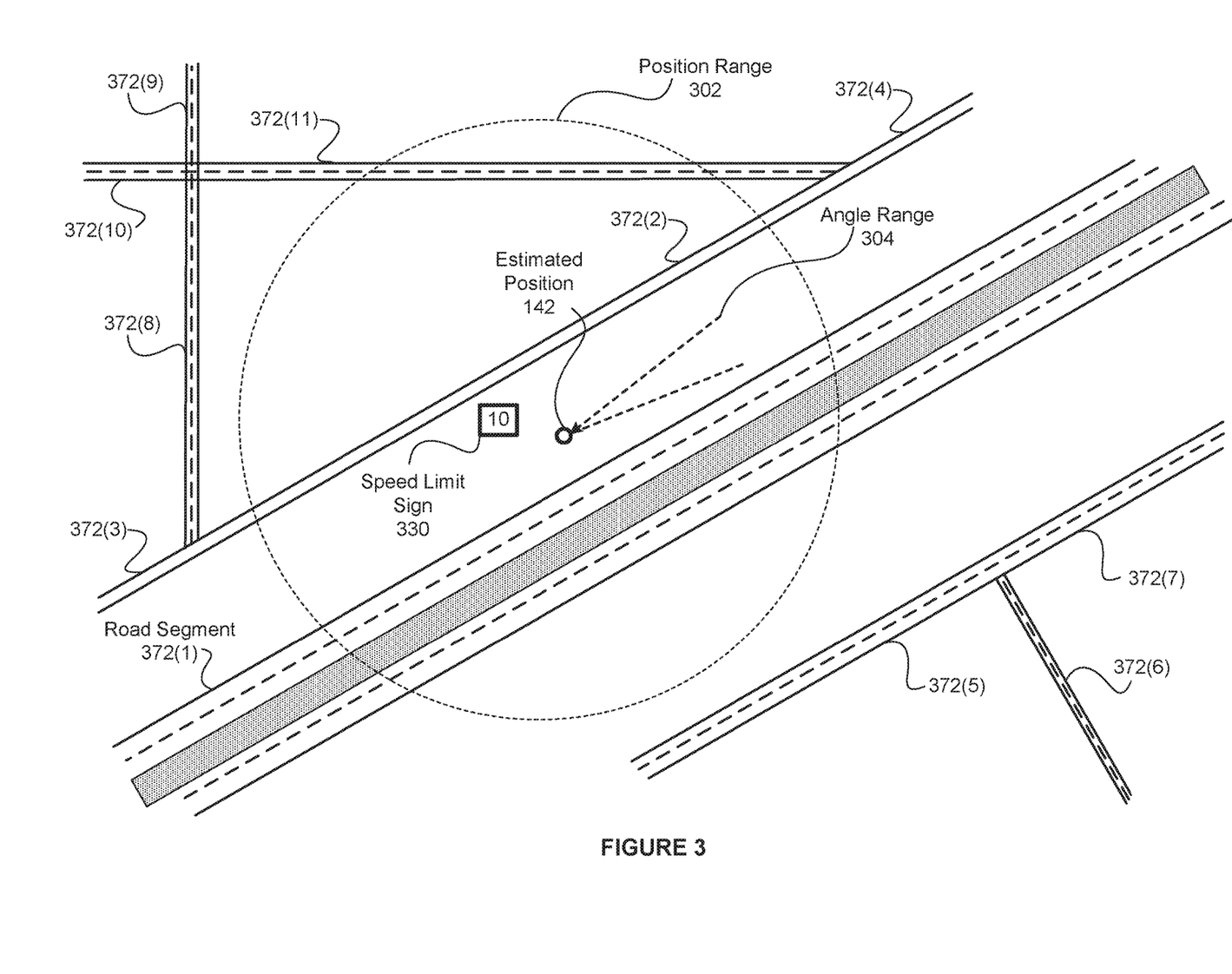
FIG. 3 illustrates an example of road segments represented by the edges of FIG. 2, according to various embodiments.

FIG. 3 illustrates an example of road segments 372 represented by the edges 130 of FIG. 2, according to various embodiments. As shown, a speed limit sign 330 specifies 10 miles per hour and lies along the road segment 372(2) that is a portion of a frontage road. The frontage road runs substantially parallel to and relatively close to the road segment 372(1) that is a portion of a freeway. For explanatory purposes only, the road segment 372(1) is represented as the edge 130(1) included in the road network graph 120, and the road segment 372(2) in represented as the edge 130(2) included in the road network graph 120. The observational point 140 (not shown in FIG. 3), corresponds to multiple observations of the speed limit sign 330. Accordingly, the content 146 specifies a road sign type of "speed limit of 10 miles per hour."

The estimated heading 144 included in the observational point 140 specifies a traveling direction that is substantially equal to both the traveling direction associated with the road segment 372(1) and the traveling direction associated with the road segment 372(2). However, because of inaccuracies in data provided by sensors, and as depicted with an unfilled circle, the estimated position 142 included in the observational point 140 lies closer to the road segment 372(1) than the road segment 372(2).

As described in detail in conjunction with FIG. 2, the search engine 240 generates a position range 302 and an angle range 304. The search engine 240 then identifies that both a portion of the edge 130(1) and a portion of the edge 130(2) lie within the position range 302 and are associated with traveling directions that lie within the angle range 304.

Consequently, the search engine generates two candidates 170. The candidate 170(1) includes the candidate edge 272(1) that is equal to the edge 130(1), and the candidate 170(2) includes the candidate edge 272(2) that is equal to the edge 130(2).

Because the distance between the candidate edge 272(1) and the observational point 140 is less than the distance between the candidate edge 272(2) and the observational point 140, the physical engine 250 sets the physical factor 255(1) to a higher value than the physical factor 255(2). However, the content 148 specifies a road sign type "speed limit of 10 miles per hour," the attribute 195(1) associated with the candidate edge 272(1) specifies a freeway road type, and the road characteristics list 206 specifies that a speed limit range for a freeway road type is between 50 miles per hour and 85 miles per hour. Consequently, the attribute engine 260 identifies the attribute 195(1) associated with the candidate edge 272(1) as an inconsistent attribute 195, and sets an attribute inconsistency factor associated with the candidate edge 272(1) to a relatively small value (e.g., 0.01).

Subsequently, the attribute engine 260 sets the quality level 276(1) associated with the candidate edge 272(1) equal to the product of the physical factor 255(1) and the attribute inconsistency factor associated with the candidate edge 272(1). Further, the attribute engine 260 sets the quality level 276(2) associated with the candidate edge 272(2) equal to the physical factor 255(2). As a result, the quality level 276(1) is significantly lower than the quality level 276(2), and the rank engine 270 correctly sets the matching edge 182 equal to the edge 130(2) representing the segment of the frontage road along which the speed limit sign 330 lies.

Upon receiving the matching edge 182, the attribute application 190 generates the attribute 195 that associates the edge 130(2) with the content 148 specifying a road sign type "speed limit of 10 miles per hour." By contrast, because the distance between the edge 130(1) and the observational point 140 is less than the distance between the edge 130(2) and the observational point 140, a conventional attribute application would generate an incorrect attribute 195 that associates the edge 130(1) with the content 148. Accordingly, a navigation application relying on the incorrect attribute 195 would erroneously associate a speed limit of 10 miles per hour with the portion of the freeway represented by the edge 130(1).

Figure 4:
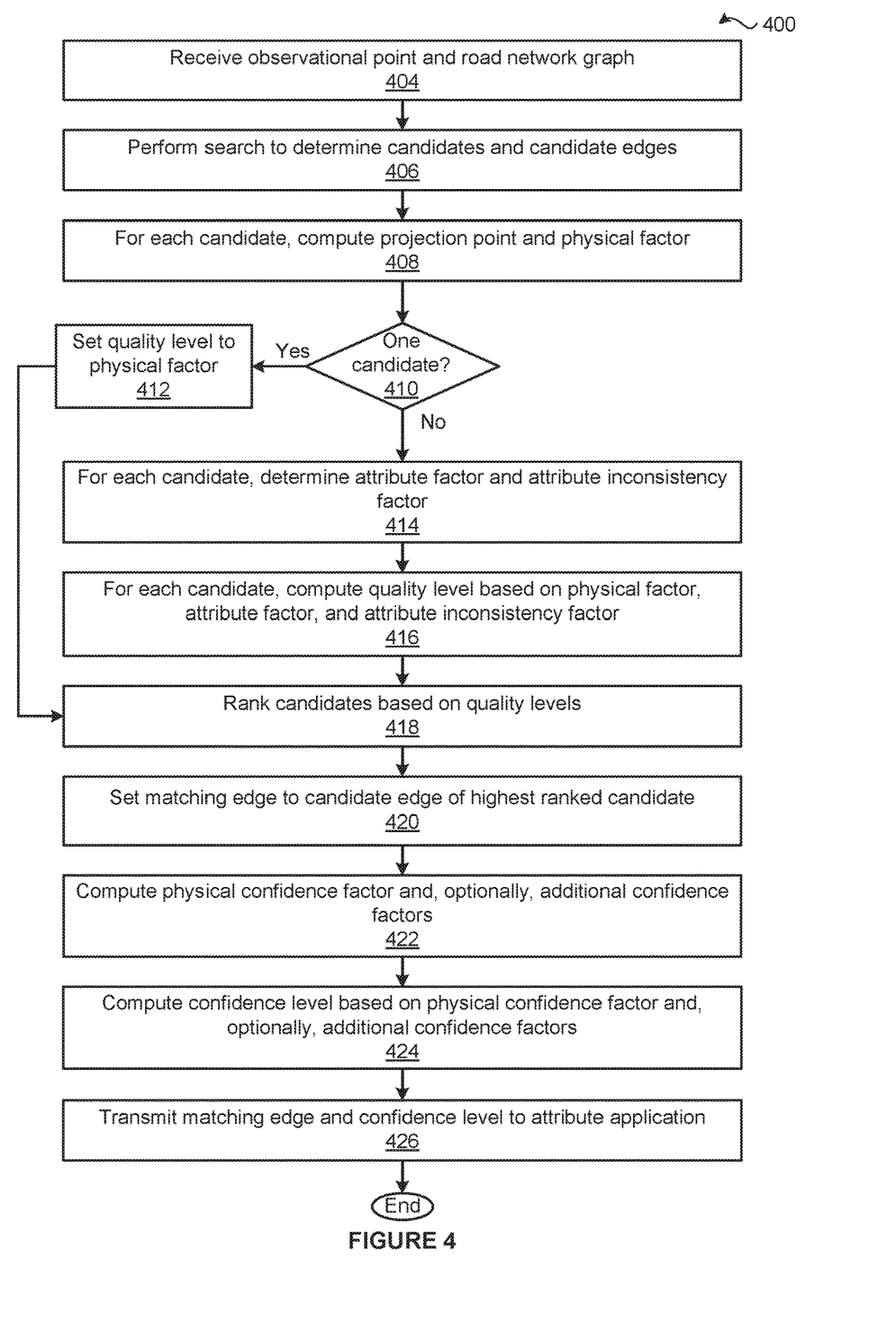
FIG. 4 is a flow diagram of method steps for associating content specified in relation to an estimated position with a road segment, according to various embodiments.

FIG. 4 is a flow diagram of method steps for associating content specified with respect to an observational point with a road segment, according to various embodiments. Although the method steps are described in conjunction with the systems of FIGS. 1-3, persons skilled in the art will understand that any system configured to implement the method steps, in any order, falls within the scope of the contemplated embodiments.

As shown, a method 400 begins at step 404, where the match application 150 receives the observational point 140 and the road network graph 120. At step 406, the search engine 240 performs search operations on the road network graph 120. The search operations identify any number of the edges 130 based on the estimated position 142 and the estimated heading 144 included in the observational point 140. For each identified edge 130, the search engine sets the candidate edge 272 equal to the identified edge 130 and generates the candidate 170 that includes the candidate edge 272. At step 408, for each of the candidates 170, the physical engine 250 computes the projection point 274 and the physical factor 255.

At step 410, the attribute engine 260 determines whether the total number of the candidates 170 is equal to one. If, at step 410, the attribute engine 260 determines that the total number of the candidates 170 is equal to one, then the method 400 proceeds to step 412. At step 412, the attribute engine 260 sets the quality level 276 included in the single candidate 170 equal to the physical factor 255 associated with the single candidate 170. The method 400 then proceeds directly to step 418. If, however, at step 410, the attribute engine 260 determines that the total number of the candidates 170 is greater than one, then the method 400 proceeds directly to step 414.

At step 414, for each of the candidates 170, the attribute engine 260 determines the attribute factor and the attribute inconsistency factor. In various embodiments, the attribute engine 260 may set the attribute factor associated with the candidate 170(x) equal to one unless the candidate edge 272(x) is associated with an unlikely attribute 195. Similarly, the attribute engine 260 may set the attribute inconsistency factor associated with the candidate 170(x) equal to one unless the candidate edge 170(x) is associated with an inconsistent attribute 195. At step 416, for each of the candidates 170, the attribute engine 260 computes the quality level 276 based on the physical factor 255, the attribute factor, and the attribute inconsistency factor.

At step 418, the rank engine 270 ranks the candidates 170 based on the quality levels 276. At step 420, the rank engine 270 sets the matching edge 182 equal to the candidate edge 272 included in the highest quality candidate 170. At step 422, the confidence engine 280 computes a physical confidence factor associated with the matching edge 182 based on the total number of the candidates 170 and the quality levels 276. As part of step 422, the confidence engine 280 may compute any number of additional confidence factors based on the attributes 195 associated with the matching edge 182.

At step 424, the confidence engine 280 computes the confidence level 184 based on the physical confidence factor and, optionally, any additional confidence factors. At step 426, the match application 150 transmits the matching edge 182 and the confidence level 184 to the attribute application 150. The attribute application 150 then generates a new or updated attribute 195 that associates the content 182 with the matching edge 182. In alternate embodiments, the match application 150 may transmit any portion of the match data 160 to any number and type of applications. In some embodiments, the match application 150 may transmit any information associated with the matching edge 182 or any request for information associated with the matching edge 182 to any application. For example, the match application 150 could transmit an identification of the matching edge 182 and the confidence level 184. In another example, the match application 150 could transmit a speed limit specified in one of the attributes 195 associated with the matching edge 182. The method 400 then terminates.

In sum, the disclosed techniques may be used to associate observational points specifying content observed by vehicles traveling along roads with edges specifying road segments in a road network graph. An observational point may include, without limitation, an estimated position, an estimated heading, a side, and content that is derived from one or more observations of the object. A match application includes, without limitation, a search engine, a physical engine, an attribute engine, a rank engine, and a confidence engine. In operation, the match application receives an observational point that is derived from any number of observations of a single object that lies along a road segment. The search engine determines a position range based on the estimated position and an angle range based on the estimated heading. The search engine then performs searching operations that identify edges included in the road network graph as candidate edges. For each candidate edge, at least a portion of the candidate edge lies within the position range and a traveling direction associated with the portion of the candidate edge lies within the angle range. Subsequently, for each candidate edge, the search engine generates a candidate that includes the candidate edge.

For each candidate, the physical engine computes a physical factor based on a distance between the estimated position and the candidate edge, a difference between the estimated heading and a traveling direction associated with the candidate edge, a projection point along the candidate edge, and (optionally) a width of the candidate edge. Subsequently, for each candidate, the attribute engine generates a quality level based on the physical factor and, optionally, existing attributes (e.g., type of road) associated with the candidate edge. The rank engine ranks the candidates based on the quality levels and selects the candidate edge included in the highest ranked candidate as the matching edge. Finally, a confidence engine generates a confidence level based on the total number of the candidate edges, the quality levels, and (optionally) distances associated with the matching edge, intersections, and/or exits.

At least one advantage of the disclosed techniques is that the likelihood that the match application correctly identifies the "proper" road segment along which the content lies is increased relative to conventional approaches. More specifically, by comparing multiple candidate edges based on a variety of factors, the match engine is able to more accurately identify the proper edge and corresponding road segment along which the content lies when a distance between the estimated position and the proper edge is larger than a distance between the estimated position and a different edge. By contrast, in such a scenario, conventional approaches would incorrectly identify the different edge that corresponds to a different road segment as the proper edge.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for associating an object with a road segment, the method comprising, via a processor:
generating at least one observation by at least one vehicle of the object that is external to the at least one vehicle;
performing one or more search operations on a road network graph based on an estimated position of the object external to the at least one vehicle to identify a plurality of candidate edges, wherein each candidate edge included in the plurality of candidate edges corresponds to a different road segment;

determining that a first candidate edge included in the plurality of candidate edges corresponds to the object external to the at least one vehicle by:

computing a first quality level associated with the first candidate edge based on at least a first distance and a first angle, wherein the first distance comprises a distance between the estimated position of the object external to the at least one vehicle and the first candidate edge, and the first angle comprises an angle between an estimated heading of the at least one vehicle when observing the object external to the at least one vehicle and a direction associated with the first candidate edge, and determining that the first quality level is greater than a quality level associated with any other candidate edge included in the plurality of candidate edges; and in response to determining that the first candidate edge corresponds to the object external to the at least one vehicle, transmitting at least one of information associated with the first candidate edge or a request for information associated with the first candidate edge to an application.

2. The method of claim 1, wherein transmitting information associated with the first candidate edge comprises transmitting an identification of the first candidate edge.

3. The method of claim 1, wherein performing the one or more search operations comprises:

computing a position range based on the estimated position of the object external to the at least one vehicle and a maximum distance;

computing an angle range based on the estimated heading of the at least one vehicle when observing the object external to the at least one vehicle and a maximum angle difference;

determining that at least a portion of the first candidate edge lies within the position range and a first direction associated with the at least the portion of the first candidate edge lies within the angle range; and in response, including the first candidate edge in the plurality of candidate edges.

4. The method of claim 1, wherein computing the first quality level comprises:

projecting the estimated position of the object external to the at least one vehicle onto the first candidate edge to determine a first projection factor; and generating a physical factor based on the first distance, the first angle, the first projection factor, and a width associated with the first candidate edge; and setting the first quality level based on the physical factor.

5. The method of claim 1, wherein computing the first quality level comprises computing a physical factor based on at least the first distance and the first angle, and adjusting the physical factor based on one or more attributes associated with the first candidate edge.

6. The method of claim 5, wherein a first attribute included in the one or more attributes specifies that the first candidate edge corresponds to a road segment included in a roundabout, a road segment included in a square, or a road segment that lies within a parking lot.

7. The method of claim 1, further comprising transmitting a confidence level to the application, wherein the confidence level indicates a confidence that the object is associated with a road segment corresponding to the first candidate edge.

8. The method of claim 7, further comprising computing the confidence level based on at least one of the first quality level, a second quality level that is associated with a second candidate edge included in the plurality of candidate edges, a number of candidate edges included in the plurality of candidate edges, or one or more distances associated with the first candidate edge.

9. The method of claim 8, wherein a first distance included in the one or more distances comprises a distance from a start of the first candidate edge or an end of the first candidate edge to a position associated with an exit lane attribute.

10. One or more non-transitory computer-readable storage media including instructions that, when executed by one or more processors, cause the one or more processors to associate an object with a road segment by performing the steps of:

generating at least one observation by at least one vehicle of the object that is external to the at least one vehicle;

performing one or more search operations on a road network graph based on an estimated position of the object external to the at least one vehicle and a maximum distance to identify a plurality of candidate edges, wherein each candidate edge included in the plurality of candidate edges corresponds to a different road segment;

determining a traveling direction associated with a first candidate edge included in the plurality of candidate edges;

determining that the first candidate edge corresponds to the object external to the at least one vehicle by:

computing a first quality level associated with the first candidate edge based on at least a first distance and a first angle, wherein the first distance comprises a distance between the estimated position of the object external to the at least one vehicle and the first candidate edge, and the first angle comprises an angle between an estimated heading of the at least one vehicle when observing the object external to the at least one vehicle and the traveling direction, and determining that the first quality level is greater than a quality level associated with any other candidate edge included in the plurality of candidate edges; and in response to determining that the first candidate edge corresponds to the object external to the at least one vehicle, transmitting at least one of information associated with the first candidate edge or a request for information associated with the first candidate edge to an application.

11. The one or more non-transitory computer-readable storage media of claim 10, wherein performing the one or more search operations comprises:

computing a position range based on the estimated position of the object external to the at least one vehicle and the maximum distance;

computing an angle range based on the estimated heading of the at least one vehicle when observing the object external to the at least one vehicle and a maximum angle difference;

determining that at least a portion of the first candidate edge lies within the position range and a direction associated with the at least the portion of the first candidate edge lies within the angle range; and in response, including the first candidate edge in the plurality of candidate edges.

12. The one or more non-transitory computer-readable storage media of claim 10, wherein computing the first quality level comprises:

projecting the estimated position of the object external to the at least one vehicle onto the first candidate edge to determine a first projection factor; and generating a physical factor based on the first distance, the first angle, the first projection factor, and a width associated with the first candidate edge; and setting the first quality level based on the physical factor.

13. The one or more non-transitory computer-readable storage media of claim 10, wherein computing the first quality level comprises computing a physical factor based on at least the first distance and the first angle, and adjusting the physical factor based on one or more attributes associated with the first candidate edge.

14. The one or more non-transitory computer-readable storage media of claim 13, wherein a first attribute included in the one or more attributes indicates that the first candidate edge is associated with a first speed category, content associated with the object describes a road sign specifying a first speed limit, and adjusting the physical factor comprises decreasing the physical factor based on comparing the first speed category to the first speed limit.

15. The one or more non-transitory computer-readable storage media of claim 10, further comprising transmitting a confidence level to the application, wherein the confidence level indicates a confidence that the object is associated with a road segment corresponding to the first candidate edge.

16. The one or more non-transitory computer-readable storage media of claim 15, further comprising computing the confidence level based on at least one of the first quality level, a second quality level that is associated with a second candidate edge included in the plurality of candidate edges, a number of candidate edges included in the plurality of candidate edges, or one or more distances associated with the first candidate edge.

17. The one or more non-transitory computer-readable storage media of claim 16, wherein a first distance included in the one or more distances comprises a distance from a start of the first candidate edge or an end of the first candidate edge to a first node that corresponds to an intersection between roads.

18. A system for associating an object with a road segment, the system comprising:

one or more memories storing a match application; and
one or more processors coupled to the one or more memories, wherein when executed by the one or more processors, the match application causes the one or more processors to:
generate at least one observation by at least one vehicle of the object that is external to the at least one vehicle
identify a plurality of candidate edges included in a road network graph based on an estimated position of the object external to the at least one vehicle, wherein each candidate edge included in the plurality of candidate edges corresponds to a different road segment;
determining that a first candidate edge included in the plurality of candidate edges corresponds to the object external to the at least one vehicle by:
computing a first quality level associated with the first candidate edge based on at least a first distance and a first angle, wherein the first distance comprises a distance between the estimated position of the object external to the at least one vehicle and the first candidate edge, and the first angle comprises an angle between an estimated heading of the at least one vehicle when observing the object external to the at least one vehicle and a direction associated with the first candidate edge, and
determining that the first quality level is greater than a quality level associated with any other candidate edge included in the plurality of candidate edges; and
in response to determining that the first candidate edge corresponds to the object external to the at least one vehicle, transmit at least one of information associated with the first candidate edge or a request for information associated with the first candidate edge to an application.

\* \* \* \* \*

UNITED STATES PATENT AND TRADEMARK OFFICE
CERTIFICATE OF CORRECTION

Page 1 of 1

PATENT NO. : 11,055,986 B2
APPLICATION NO. : 15/653308
DATED : July 6, 2021
INVENTOR(S) : Volodymyr Ivanov, Alexey Pryakhin and Ievgenii Borshch It is certified that error appears in the above-identified patent and that said Letters Patent is hereby corrected as shown below:

In the Claims

Column 18, Claim 9, Line 4, please delete "first";

Column 19, Claim 17, Line 33, please delete "first".

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*